(12) United States Patent  
Iwaya et al.

(10) Patent No.: US 8,778,542 B2  
(45) Date of Patent: Jul. 15, 2014

(54) LITHIUM ION SECONDARY BATTERY COMPRISING AN ACTIVE MATERIAL AND SOLID ELECTROLYTE FORMING A MATRIX STRUCTURE AND METHOD FOR MANUFACTURING SAME

(75) Inventors: Shoichi Iwaya, Niigata (JP); Hiroshi Sato, Niigata (JP); Takayuki Fujita, Niigata (JP); Gou Toida, Niigata (JP)

(73) Assignee: Namics Corporation, Niigata (JP)

( * ) Notice: Subject to any disclaimer, the term of this patent is extended or adjusted under 35 U.S.C. 154(b) by 176 days.

(21) Appl. No.: 13/139,130

(22) PCT Filed: Dec. 9, 2009

(86) PCT No.: PCT/JP2009/070603  
§ 371 (c)(1),  
(2), (4) Date: Aug. 9, 2011

(87) PCT Pub. No.: WO2010/067818  
PCT Pub. Date: Jun. 17, 2010

(65) Prior Publication Data  
US 2012/0015234 A1  Jan. 19, 2012

(30) Foreign Application Priority Data

Dec. 10, 2008  (JP) .................................. 2008-314737

(51) Int. Cl.  
*H01M 4/13* (2010.01)  
*H01M 4/58* (2010.01)  
*H01M 4/525* (2010.01)  
*H01M 10/04* (2006.01)  
*H01M 10/0562* (2010.01)  
*C04B 35/64* (2006.01)

(52) U.S. Cl.  
USPC ........ 429/305; 429/152; 429/322; 429/231.2; 429/231.3; 429/231.95; 29/623.3; 264/614; 264/618

(58) Field of Classification Search  
USPC .............. 429/152, 122, 213, 322, 231.5, 223, 429/219, 231.95, 231.2, 231.3, 305; 29/623.1, 623.3; 428/577; 252/182.1; 264/614, 618  
See application file for complete search history.

(56) References Cited

U.S. PATENT DOCUMENTS 5,789,108 A * 8/1998 Chu .............................. 429/213  
2007/0172739 A1* 7/2007 Visco et al. ................... 429/322

(Continued)

FOREIGN PATENT DOCUMENTS

JP  2002-289176  10/2002  
JP  2004-213938  7/2004

(Continued)

OTHER PUBLICATIONS

Wang, et al., "Micro-Macroscopic Coupled Modeling of Batteries and Fuel Cells Par 1. Model Development", J. Electrochem. Soc., 1998, P1-25. Retrieved online on May 30, 2013 from: http://mtrl1.me.psu.edu/Document/JESIP98.pdf.*

(Continued)

*Primary Examiner* — Kenneth Douyette  
(74) *Attorney, Agent, or Firm* — Hamre, Schumann, Mueller & Larson, P.C.

(57) ABSTRACT

A conventional, multilayer, all-solid-state, lithium ion secondary battery where an electrode layer and an electrolyte layer are stacked has a problem that it has a high interface resistance between the electrode layer and the electrolyte layer and has a difficulty in increasing the capacity of the battery. A battery has been manufactured by applying pastes of a mixture of an active material and a solid electrolyte to form electrode layers and baking a laminate of electrode layers and electrolyte layers at a time. As a result, a matrix structure including the active material and the solid electrolyte has been formed in the electrode layers, so that a battery with a large capacity and a reduced interface resistance between the electrode layer and the electrolyte layer has been successfully achieved.

20 Claims, 7 Drawing Sheets

(56) References Cited

U.S. PATENT DOCUMENTS

| | | |
|---|---|---|
| 2007/0175020 A1 | 8/2007 | Nagata et al. |
| 2007/0218333 A1 | 9/2007 | Iwamoto |
| 2007/0259271 A1 | 11/2007 | Nanno |
| 2008/0081257 A1* | 4/2008 | Yoshida et al. ............... 429/209 |
| 2008/0131781 A1* | 6/2008 | Yong et al. ............... 429/231.5 |
| 2008/0311480 A1 | 12/2008 | Sano |
| 2009/0191461 A1 | 7/2009 | Nakamura |
| 2009/0202912 A1 | 8/2009 | Baba et al. |
| 2010/0075219 A1* | 3/2010 | Iwaya et al. ............... 429/158 |

FOREIGN PATENT DOCUMENTS

| | | | |
|---|---|---|---|
| JP | 2006-261008 | 9/2006 | |
| JP | 2007-005279 | 1/2007 | |
| JP | 2007-227362 | 9/2007 | |
| JP | 2008-078109 | 4/2008 | |
| JP | 2008-226728 | 9/2008 | |
| JP | 2008-251219 | 10/2008 | |
| WO | WO 2005/101551 | 10/2005 | |
| WO | WO 2007/135790 | 11/2007 | |
| WO | WO-2008/099508 A1 * | 8/2008 | ............ H01M 10/05 |
| WO | WO2008/143027 | 11/2008 | |

OTHER PUBLICATIONS

Zhang et al., "Improvement in electrochemical properties of nano-tin-polyaniline lithium ion composite anodes by control of electrode microstructure", Journal of Power Sources, 109 (2002) 136-141.*

International Search Report, PCT/JP2009/070603, Mar. 16, 2010.

* cited by examiner (a)

(b)

(c)

(d)

(e)

LITHIUM ION SECONDARY BATTERY COMPRISING AN ACTIVE MATERIAL AND SOLID ELECTROLYTE FORMING A MATRIX STRUCTURE AND METHOD FOR MANUFACTURING SAME

TECHNICAL FIELD

The invention relates to a multilayer, all-solid-state, lithium ion secondary battery including a laminate of positive electrode layers, solid electrolyte layers, and negative electrode layers, and to a method for manufacture thereof.

BACKGROUND ART

Patent Document 1: Japanese Patent Application Laid-Open No. 11-283664
Patent Document 2: Japanese Patent Application Laid-Open No. 2000-164252
Patent Document 3: Japanese Patent Application Laid-Open No. 2001-126758
Patent Document 4: Japanese Patent Application Laid-Open No. 2000-285910

In recent years, there have been remarkable advances in electronic technology, in which portable electronic devices have been designed to be smaller, lighter, thinner, and more multi-functional. With this, batteries serving as power sources for electronic devices have been strongly required to be smaller, lighter, and thinner and to have improved reliability. To meet these requirements, there has been proposed a multilayer lithium ion secondary battery in which positive electrodes and negative electrodes are stacked with solid electrolyte layers interposed therebetween. Such a multilayer lithium ion secondary battery is assembled by stacking several tens μm thick battery cells, so that the battery can be easily reduced in size, weight, and thickness. In particular, a parallel-type or series-parallel-type multilayer battery is superior in the ability to achieve a large discharge capacity even in a small cell area. An all-solid-state lithium ion secondary battery, which is produced using a solid electrolyte in place of a liquid electrolyte, does not have the risk of liquid leakage or liquid depletion and is highly reliable. Such a lithium-based battery can also produce high voltage and high energy density.

FIG. 8 is a cross-sectional view of the basic structure of a conventional, all-solid-state lithium ion secondary battery. A conventional, all-solid-state, lithium ion secondary battery has a basic structure where a negative electrode layer 103 made of a negative electrode active material, a solid electrolyte layer 102, and an positive electrode layer 101 made of a positive electrode active material are stacked in this order. Such a conventional, all-solid-state, lithium ion secondary battery has a problem that its ion conductivity is lower than that of a liquid electrolyte-based lithium ion secondary battery and its resistance of the interface between the electrolyte layer and the positive and negative electrode layers is high, resulting in a difficulty in increasing the battery capacity.

Patent Document 1 discloses a battery having one or more intermediate layers that are placed between a solid electrolyte layer and a positive electrode layer and/or a negative electrode layer and composed of 5 to 95% by weight of an active material and 5 to 95% by weight of a solid electrolyte. It suggests that the intermediate layer can reduce the polarization resistance of the interface between the electrode and the solid electrolyte so that battery characteristics such as charge-discharge characteristics and energy density can be improved.

Patent Document 2 discloses a battery having an intermediate layer that is placed between a solid electrolyte and an electrode active material and has a reaction interface between the solid electrolyte and the electrode active material. Similarly to Patent Document 1, it suggests that the intermediate layer can reduce the polarization resistance of the interface between the electrode and the solid electrolyte so that battery characteristics such as charge-discharge characteristics and energy density can be improved.

In practice, however, batteries manufactured by the techniques described in Patent Documents 1 and 2 have a problem that a significant reduction in internal resistance or an increase in battery capacity cannot be achieved.

DISCLOSURE OF INVENTION

Objects to be Achieved by the Invention

An object of the invention is to provide a multilayer, all-solid-state, lithium ion secondary battery that includes a laminate of a positive electrode layer, a solid electrolyte layer, and a negative electrode electrolyte layer and enables improvement of battery characteristics such as reduced internal resistance and increased discharge capacity, and to provide a method for manufacturing such a lithium ion secondary battery.

Means for Solving the Problems

Aspect (1) of the invention is directed to a multilayer, all-solid-state, lithium ion secondary battery, including at least a laminate of alternately stacked positive and negative electrode layers with a solid electrolyte layer interposed therebetween, wherein the positive electrode layer and/or the negative electrode layer has a structure in which an active material and a solid electrolyte form a matrix structure which is produced by baking the laminate at a time.

Aspect (2) of the invention is directed to a multilayer, all-solid-state, lithium ion secondary battery, including at least a laminate of alternately stacked positive and negative electrode layers with a solid electrolyte layer interposed therebetween, wherein the laminate has an intermediate layer between the solid electrolyte layer and the positive electrode layer and/or the negative electrode layer, and the intermediate layer has a structure in which an active material and a solid electrolyte form a matrix structure which is produced by baking the laminate at a time.

Aspect (3) of the invention is directed to the lithium ion secondary battery according to aspect (1) or (2), wherein the structure has the solid electrolyte supported on a matrix structure comprising the active material.

Aspect (4) of the invention is directed to the lithium ion secondary battery according to aspect (1) or (2), wherein the structure has the active material supported on a matrix structure comprising the solid electrolyte.

Aspect (5) of the invention is directed to the lithium ion secondary battery according to any one of aspects (1) to (4), wherein the matrix structure is a structure formed by baking a coating of a paste obtained by mixing the active material and the solid electrolyte.

Aspect (6) of the invention is directed to the lithium ion secondary battery according to any one of aspects (1) to (5), wherein the baking is performed at a temperature between 600° C. and 1,100° C.

Aspect (7) of the invention is directed to the lithium ion secondary battery according to any one of aspects (1) to (6), wherein the matrix structure has a cross-sectional area ratio of the active material to the solid electrolyte in the range of 20:80 to 80:20.

Aspect (8) of the invention is directed to the lithium ion secondary battery according to any one of aspects (1) to (7), wherein a starting material for the active material that forms the positive electrode layer and the negative electrode layer and/or the intermediate layer comprises one or more compounds selected from the group consisting of lithium manganese complex oxide, lithium nickel complex oxide, lithium cobalt complex oxide, lithium vanadium complex oxide, lithium titanium complex oxide, manganese dioxide, titanium oxide, niobium oxide, vanadium oxide, and tungsten oxide.

Aspect (9) of the invention is directed to the lithium ion secondary battery according to any one of aspects (1) to (8), wherein a starting material for the electrolyte that forms the positive electrode layer and the negative electrode layer and/or the intermediate layer comprises one or more compounds selected from the group consisting of lithium silicophosphate ($Li_{3.5}Si_{0.5}P_{0.5}O_4$), lithium titanium phosphate ($LiTi_2(PO_4)_3$), lithium germanium phosphate ($LiGe_2(PO_4)_3$), $Li_2O$—$SiO_2$, $Li_2O$—$V_2O_5$—$SiO_2$, $Li_2O$—$P_2O_5$—$B_2O_3$, and $Li_2O$—$GeO_2$.

Aspect (10) of the invention is directed to a method for manufacturing a lithium ion secondary battery, including at least: a stacking step of alternately stacking green sheets for positive and negative electrode layers with a green sheet for an electrolyte layer interposed therebetween to form a laminate of an electrolyte layer, a positive electrode layer, and a negative electrode layer; and a step of baking the laminate at a time to form a sintered laminate, wherein the green sheet for the positive electrode layer and/or the green sheet for the negative electrode layer is formed by applying a paste obtained by mixing at least an active material and a solid electrolyte and baked so that the positive electrode layer and/or the negative electrode layer has a structure in which the active material and the solid electrolyte form a matrix structure.

Aspect (11) of the invention is directed to a method for manufacturing a lithium ion secondary battery, including at least: a stacking step of alternately stacking green sheets for positive and negative electrode layers with a green sheet for an electrolyte layer interposed therebetween to form a laminate of an electrolyte layer, a positive electrode layer, a negative electrode layer, and an intermediate layer; and a step of baking the laminate at a time to form a sintered laminate, wherein a green sheet for an intermediate layer is placed between the green sheet for the positive electrode layer and the green sheet for the electrolyte layer and/or between the green sheet for the negative electrode layer and the green sheet for the electrolyte layer, and the intermediate layer is formed by applying a paste obtained by mixing at least an active material and a solid electrolyte and baked so that the intermediate layer has a structure in which the active material and the solid electrolyte form a matrix structure.

Aspect (12) of the invention is directed to the method for manufacturing a lithium ion secondary battery according to aspect (10) or (11), wherein the paste comprises: a powder comprising the active material and having a particle size of 3 µm or less; and a powder comprising the solid electrolyte and having a particle size of 3 µm or less.

Aspect (13) of the invention is directed to the method for manufacturing a lithium ion secondary battery according to any one of aspects (10) to (12), wherein the powder comprising the active material and the powder comprising the solid electrolyte are mixed in a volume ratio of 20:80 to 80:20 to form the paste.

Aspect (14) of the invention is directed to the method for manufacturing a lithium ion secondary battery according to any one of aspects (10) to (13), wherein a boron compound is mixed as an additive into the paste.

Aspect (15) of the invention is directed to the method for manufacturing a lithium ion secondary battery according to any one of aspects (10) to (14), wherein the laminate is baked at a temperature between 600° C. and 1,100° C.

Effects of the Invention

According to aspects (1) to (5), (10), and (11) of the invention, the matrix structure allows the active material and the solid electrolyte to be entangled with each other so that the contact area between the active material and the solid electrolyte is significantly increased and the contact areas between the active materials and between the solid electrolytes are also significantly increased, which is effective in reducing the internal resistance of the lithium ion secondary battery and in increasing the discharge capacity of the lithium ion secondary battery.

According to aspect (3) of the invention, in particular, the contact area between the active materials is significantly increased, which is effective in reducing the internal resistance of the lithium ion secondary battery and in increasing the discharge capacity of the lithium ion secondary battery.

According to aspect (4) of the invention, in particular, the contact area between the solid electrolytes is significantly increased, which is effective in reducing the internal resistance of the lithium ion secondary battery and in increasing the discharge capacity of the lithium ion secondary battery.

According to aspect (6) to (8) and (12) to (15) of the invention, there is formed a matrix structure in which the active material and the solid electrolyte are entangled with each other and/or a structure in which the solid electrolyte is supported on a matrix structure comprising the active material and/or a structure in which the active material is supported on a matrix structure comprising the solid electrolyte.

Figure 1:
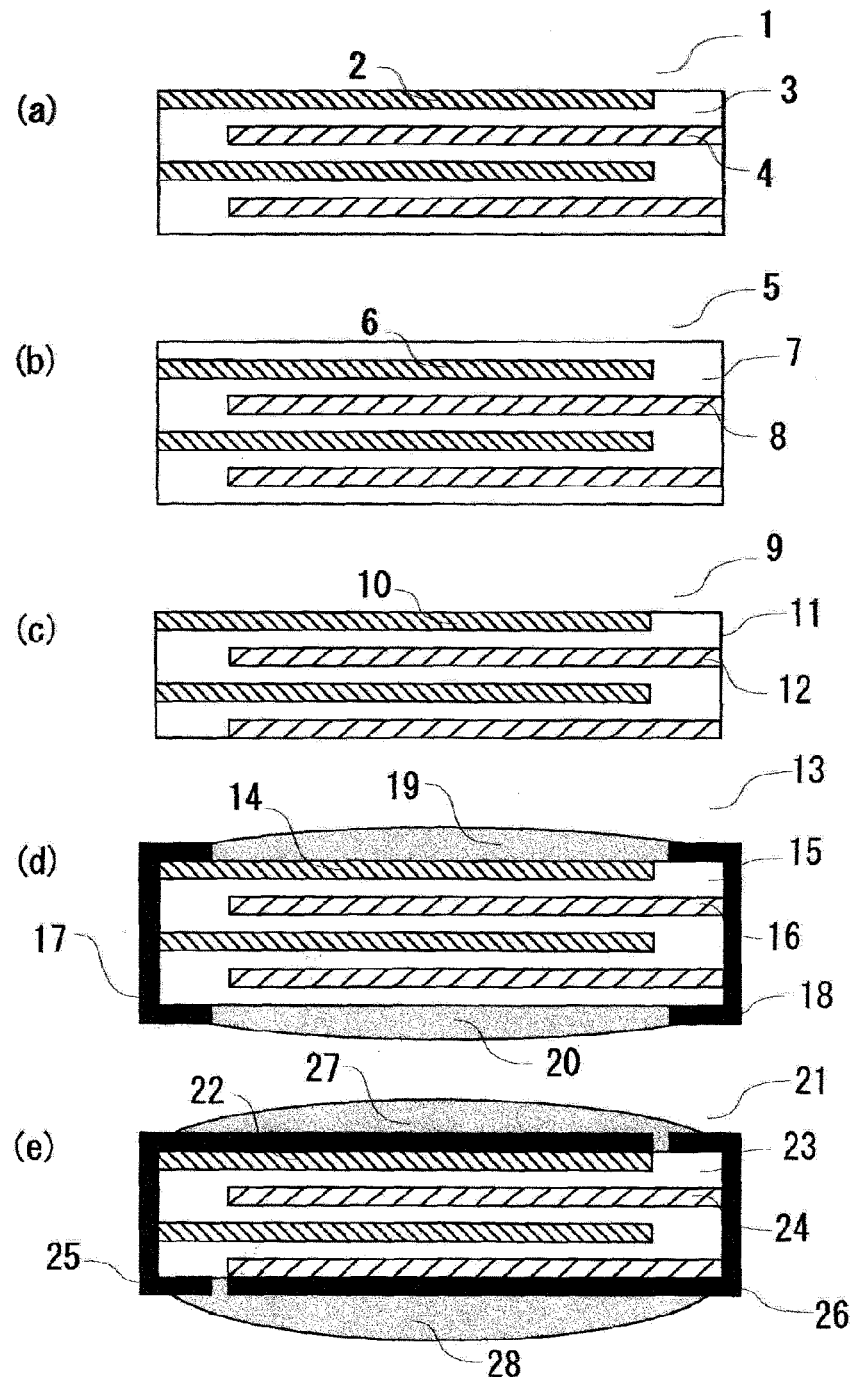
FIGS. 1(a) to 1(e) are cross-sectional views of lithium ion secondary batteries according to embodiments of the invention.

In the drawings, reference numerals 1, 5, and 9 represent a laminate; 13 and 21 a battery; 2, 6, 10, 14, and 22 a positive electrode layer; 3, 7, 11, 15, and 23 a solid electrolyte layer; 4, 8, 12, 16, and 24 a negative electrode layer; 17 and 25 a positive electrode terminal; 18 and 26 a negative electrode terminal; 19, 20, 27, and 28 a protective layer; 31, 33, and 36 a PET substrate; 32, 34, 37, and 39 a solid electrolyte sheet; 35 and 41 a positive electrode sheet; 38 and 40 a negative electrode sheet; 42 and 45 a solid electrolyte layer; 43 and 47 a positive electrode layer; 44 and 46 a negative electrode layer; 48 a positive electrode terminal; 49 a negative electrode terminal; 51 a positive electrode layer comprising a mixture of an active material and a solid electrolyte; 52 a solid electrolyte layer; 53 a negative electrode layer comprising a mixture of an active material and a solid electrolyte; 54 a positive electrode layer comprising an active material; 55 and 57 an intermediate layer comprising a mixture of an active material and a solid electrolyte; 56 a solid electrolyte layer; 58 a negative electrode layer comprising an active material; 101 a positive electrode layer; 102 a solid electrolyte layer; and 103 a negative electrode layer.

BEST MODE FOR CARRYING OUT THE INVENTION

Hereinafter, the best mode of the invention will be described.

A lithium ion secondary battery according to an embodiment of the invention is manufactured by mixing a positive electrode active material and a solid electrolyte to prepare a positive electrode paste; mixing a negative electrode active material and a solid electrolyte to prepare a negative electrode paste; preparing a solid electrolyte paste comprising a solid electrolyte; applying the negative electrode paste; the solid electrolyte paste and the positive electrode paste sequentially onto a substrate to form a laminate; and baking the laminate at a time.

The inventors have found that appropriate selection of the active material and the solid electrolyte material for use in forming an electrode (positive electrode or negative electrode); appropriate selection of the mixing ratio of powder materials, the powder particle size, and an additive (sintering aid) in the process of preparing an electrode-forming paste; and optimization of baking conditions for the one-time baking process make it possible to form a battery electrode layer having a structure in which a lithium ion-conducting matrix comprising a solid electrolyte and an electron-conducting matrix comprising an active material are entangled with each other to provide increased contact areas between the solid electrolyte and the active material, between the solid electrolytes, and between the active materials, which significantly reduces the internal resistance of the battery and significantly increases the discharge capacity.

Also when a structure having a solid electrolyte supported on a matrix structure comprising an active material or a structure having an active material supported on a matrix structure comprising a solid electrolyte is formed depending on manufacturing conditions such as the mixing ratio of the active material and the solid electrolyte, the same effect is obtained as when the above structure is formed in which a lithium ion-conducting matrix comprising a solid electrolyte and an electron-conducting matrix comprising an active material are entangled with each other.

It is considered that both when the positive electrode layer and/or the negative electrode layer has a structure in which a lithium ion-conducting matrix comprising a solid electrolyte and an electron-conducting matrix comprising an active material are entangled with each other and when the positive electrode layer and/or the negative electrode layer has a structure having a solid electrolyte supported on a matrix structure comprising an active material or a structure having an active material supported on a matrix structure comprising a solid electrolyte, a reduction in the resistance of the interface between the solid electrolyte and the active material or an increase in electron conductivity is achieved together with an increase in lithium ion conductivity, so that a significant reduction in internal resistance is achieved.

As used herein, the term "matrix" or "matrix structure" means a structure in which material particles that form the matrix are in contact with one another to be three-dimensionally continuous. As for the term "three-dimensionally continuous," a structure having a discontinuous part in a two-dimensional cross-section can be still three-dimensionally continuous, if at least another cross-section is continuous.

A lithium ion secondary battery according to an embodiment of the invention is preferably manufactured by stacking a collector layer of an electrically-conductive material on the positive electrode layer and/or the negative electrode layer. This makes it possible to further reduce the internal resistance of the battery.

In contrast to the method for manufacturing the battery of the invention, Patent Document 1 discloses an invention in which a battery is manufactured by preparing pastes as materials for a positive electrode layer, an intermediate layer, a solid electrolyte layer, an intermediate layer, and a negative electrode layer; applying the pastes to form a laminate; and then subjecting the laminate to roller rolling, heating and drying without performing one-time baking.

Patent Document 2 discloses an invention in which a battery is manufactured by preparing pastes as materials for a positive electrode layer, an intermediate layer, a solid electrolyte layer, an intermediate layer, and a negative electrode layer; applying the pastes to form a laminate; and then subjecting the laminate to roller rolling, heating and drying. In Patent Document 2, baking is performed when a mixed powder is formed as a material for the intermediate layer, but after the laminate is formed, one-time baking is never performed.

Reasons why batteries manufactured by these conventional techniques do not have good characteristics are considered to be that according to Patent Document 1, baking is not performed so that no matrix structure is formed in the electrode layer; and according to Patent Document 2, even though baking is performed when a powder is formed, no matrix structure is formed because baking is not performed after pulverizing the baked material, adding a solvent to the pulverized material to form a paste, and applying the paste to form an electrode layer; or even though a matrix structure is formed once, such a structure is broken in the step of forming the paste.

[Battery Structure]

FIGS. 1(*a*) to 1(*e*) are cross-sectional views illustrating a laminate used to form a multilayer, all-solid-state, lithium ion secondary battery according to an embodiment of the invention, the structure of the battery, and modifications thereof.

FIG. 1(*a*) is a cross-sectional view illustrating the structure of a most basic laminate. The laminate 1 includes positive electrode layers 2 and negative electrode layers 4 which are alternately stacked with a solid electrolyte layer 3 interposed therebetween. When the laminate is formed after a positive electrode sheet or a negative electrode sheet is formed on a solid electrolyte sheet as in the battery manufacturing method described below, a structure having a lower face of the solid electrolyte layer and an upper face of the electrode layer as shown in FIG. 1(a) can be formed by the smallest number of steps. When a single battery cell is defined as a laminate having a positive electrode layer and a negative electrode layer stacked with a solid electrolyte interposed therebetween, three battery cells are stacked in FIG. 1(a). The technique related to the lithium ion secondary battery of the invention is not limited to the illustrated case where three battery cells are stacked, and may be applied to batteries in which any plural number of layers are stacked, and variations can be made depending on the required capacity or current specification of the lithium ion secondary battery. To sufficiently acquire the merit of the technique according to the invention, the number of battery cells is preferably from 2 to 500, more preferably from 5 to 250. In FIG. 1(a), the positive electrode layer extends to the left end face of the laminate, and the negative electrode layer extends to the right end face of the laminate. This structure is suitable for parallel or series-parallel batteries in which electrode terminals are placed at end faces. The technique related to the lithium ion secondary battery of the invention may be applied not only to a parallel battery as shown in the drawing but also to a series or series-parallel battery.

FIG. 1(b) illustrates a structure in which a solid electrolyte layer 7 is placed at the upper and lower faces of a laminate 5.

FIG. 1(c) illustrates a structure in which a positive electrode layer is placed at the upper face of a laminate 9, while a negative electrode layer is placed at the lower face thereof. The laminate having the structure shown in FIG. (c) is effective in reducing the impedance of battery cells at the upper and lower end faces, because, as in the battery shown in FIG. 1(e), conductive electrode terminals can be brought into contact with and drawn from the electrode layers at the upper and lower faces.

FIG. 1(d) is a cross-sectional view of a lithium ion secondary battery 13 including the laminate shown in FIG. 1(a), electrode terminals placed on the sides of the laminate, and a protective layer placed on the laminate. The battery 13 has a left side face, at which a positive electrode terminal 17 is electrically connected to positive electrode layers 14, and a right side face, at which a negative electrode terminal 18 is electrically connected to negative electrode layers 18. The protective layer, which is formed as an outermost layer of the battery, protects the battery electrically, physically, and chemically. The protective layer is preferably made of an environmentally safe material having high insulation properties, durability, and moisture resistance, such as a ceramic or resin.

[Basic Battery Structure]

Figure 3:
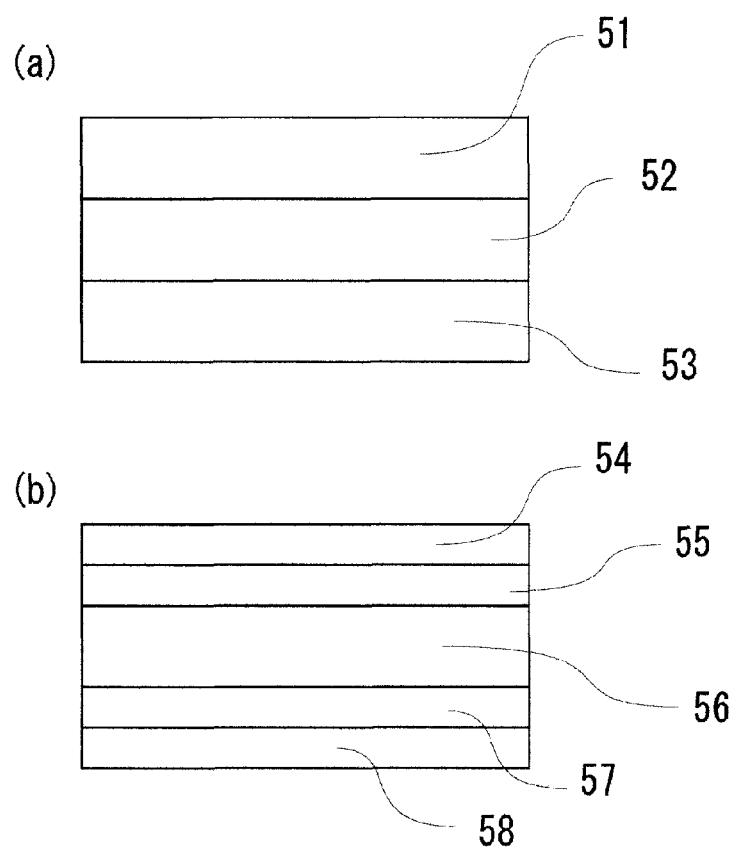
FIGS. 3(a) and 3(b) are cross-sectional views of first and second examples of the basic structure of a lithium ion secondary battery according to an embodiment of the invention.

FIGS. 3(a) and 3(b) are cross-sectional views each illustrating a basic battery structure according to an embodiment of the invention. While the battery according to the invention may form a practical product having a multilayer structure in which a large number of laminates each composed of positive electrode layer/solid electrolyte layer/negative electrode layer are stacked as illustrated in FIG. 1, the cross-sectional views of FIGS. 3(a) and 3(b) illustrate only one laminate composed of positive electrode layer/solid electrolyte layer/negative electrode layer. As described above, an example of the battery of the invention has a structure as shown in FIG. 3(a), which includes a solid electrolyte layer 52 interposed between a positive electrode layer 51 and a negative electrode layer 53 each having a matrix structure composed of an active material and a solid electrolyte. Alternatively, however, the battery of the invention may have a structure whose cross-section is illustrated in FIG. 3(b). The battery illustrated in FIG. 3(b) has a structure including a negative electrode layer 58 comprising an active material, a negative electrode-side intermediate layer 57 comprising an active material and a solid electrolyte, a solid electrolyte layer 56 comprising a solid electrolyte, a positive electrode-side intermediate layer 55 comprising an active material and a solid electrolyte, and a positive electrode layer 54 comprising an active material, which are stacked in this order. A method for manufacturing it includes applying and drying a paste for forming each layer so that the respective layers are sequentially stacked, and then baking the stacked layers at a time to form a battery. Also in the case where the basic battery structure illustrated in FIG. 3(b) is used, a matrix structure including a mixture of the active material and the solid electrolyte is formed in the intermediate layers 55 and 57 similarly to the case where the basic battery structure illustrated in FIG. 3(a) is used, so that an advantageous effect such as a reduction in internal resistance or an increase in battery capacity is obtained. The matrix structure does not need to be formed in both of the positive and negative electrode layers. Even when the matrix structure is formed in any one of the layers or when an intermediate layer having the matrix structure is formed for any one of them, the effect of significantly improving battery characteristics is also obtained in contrast to batteries which do not have any matrix structure comprising an active material and a solid electrolyte.

In the positive electrode layer and/or the negative electrode layer shown in FIG. 3(a) or in the intermediate layer shown in FIG. 3(b), the cross-sectional area ratio of the active material to the solid electrolyte is preferably in the range of 20:80 to 80:20. The matrix structure formed may have a structure in which the solid electrolyte is supported on a matrix structure comprising the active material, or a structure in which the active material is supported on a matrix structure comprising the solid electrolyte. These structures are effective in significantly increasing the contact area between the active materials or between the solid electrolytes, reducing the internal resistance of the lithium ion secondary battery, and increasing discharge capacity.

A plurality of pastes having different active material contents and different solid electrolyte contents may also be prepared and applied to form a plurality of stacked layers so that the distribution of the contents of the active material and the solid electrolyte in the positive electrode layer and/or the negative electrode layer shown in FIG. 3(a) or in the intermediate layer shown in FIG. 3(b) can be controlled in the thickness direction. For example, a battery having a positive electrode, negative electrode or intermediate layer in which the content of an active material or a solid electrolyte has a gradient distribution in the thickness direction may be manufactured. For example, a battery in which the positive electrode layer shown in FIG. 3(a) has a relatively-high solid electrolyte content on the the electrolyte layer side may be manufactured, or a battery in which the intermediate layer between the positive electrode layer and the electrolyte layer shown in FIG. 3(b) has a relatively-high active material content on the positive electrode layer side and has a relatively-high solid electrolyte content on the electrolyte layer side may be manufactured, so that a battery having more improved electron and lithium ion-conducting efficiency and having excellent characteristics can be manufactured.

[Battery Materials]

(Active Materials)

The electrode layer of the lithium ion secondary battery of the invention is preferably produced using an active material capable of efficiently releasing and adsorbing lithium ions. For example, transition metal oxides or transition metal complex oxides are preferably used. More specifically, lithium manganese complex oxide, lithium nickel complex oxide, lithium cobalt complex oxide, lithium vanadium complex oxide, lithium titanium complex oxide, manganese dioxide, titanium oxide, niobium oxide, vanadium oxide, tungsten oxide, etc. are preferably used. One or more compounds selected from the group consisting of these transition metal oxides and transition metal complex oxides are preferably used. Lithium manganese complex oxide and lithium titanium complex oxide are more preferably used as active materials, because they show a particularly small change in volume, when lithium ions are adsorbed or released, and are less likely to cause pulverization or peeling of electrodes.

In the invention, there is no clear difference between positive and negative electrode active materials, and as a result of a comparison between the potentials of two compounds, the higher potential compound may be used as a positive electrode active material, while the lower potential compound may be used as a negative electrode active material.

(Solid Electrolyte Materials)

A material having low electron conductivity and high lithium ion conductivity is preferably used as a solid electrolyte to form each of the solid electrolyte layer and the electrode layer of the lithium ion secondary battery of the invention. The solid electrolyte is also preferably an inorganic material capable of being baked at high temperature in the atmosphere. For example, at least one material selected from the group consisting of lithium silicophosphate ($Li_{3.5}Si_{0.5}P_{0.5}O_4$), lithium titanium phosphate ($LiTi_2(PO_4)_3$), lithium germanium phosphate ($LiGe_2(PO_4)_3$), $Li_2O$—$SiO_2$, $Li_2O$—$V_2O_5$—$SiO_2$, $Li_2O$—$P_2O_5$—$B_2O_2$, and $Li_2O$—$GeO_2$ is preferably used. Materials produced by doping these materials with foreign elements, $Li_3PO_4$, $LiPO_3$, $Li_4SiO_4$, $Li_2SiO_3$, $LiBO_2$, or the like may also be used. The solid electrolyte layer material may also be any of crystalline, amorphous, and glassy materials.

(Additives)

A boron compound is preferably mixed as an additive into a positive electrode paste and a negative electrode paste used to form electrode layers and a solid electrolyte paste used to form a solid electrolyte layer. In the process of baking a paste of a mixture of the active material and the solid electrolyte to form an electrode layer, the addition of a boron compound is effective in accelerating the formation of a matrix structure in the electrode layer. A sintering aid may also be added to each of a positive electrode material, a solid electrolyte material, and a negative electrode material used to form the battery, and the amount of the addition of the sintering aid and the baking temperature may be controlled so that the respective materials can show the same contraction behavior, which makes it possible to prevent delamination or cracking due to internal strain or stress in the battery. The addition of a sintering aid allows a decrease in the baking temperature and is effective in reducing the manufacturing cost such as the electric power cost of the baking furnace.

[Battery Manufacturing Method]

The laminate used to form the all-solid-state, lithium ion secondary battery of the invention is manufactured by forming pastes of the respective materials for the positive electrode layer, the solid electrolyte layer, the negative electrode layer, and the optional protective layer, which are used to form the laminate, applying and drying the pastes to form green sheets, stacking the green sheets, and baking the resulting laminate at a time.

In this process, each of the positive electrode active material, the negative electrode active material, and the solid electrolyte material used to form pastes may be a product obtained by calcining an inorganic salt or the like as a raw material. The calcination should be performed so that each raw material can smoothly undergo a chemical reaction and perform its function sufficiently after the one-time baking. From this point of view, the calcination temperatures at which the positive electrode active material, the negative electrode active material, and the solid electrolyte are calcined are all preferably 700° C. or higher.

A method for forming a paste is not particularly limited. For example, a powder of each of the above materials may be mixed with an organic solvent and a binder as a vehicle so that a paste can be obtained. For example, a $LiMn_2O_4$ powder as a positive electrode active material and a $Li_{3.5}Si_{0.5}P_{0.5}O_4$ powder as a solid electrolyte may be mixed in a predetermined volume ratio, and the mixture may be dispersed in a solvent and a vehicle so that a positive electrode paste can be prepared. A $Li_{4/3}Ti_{5/3}O_4$ powder as a negative electrode active material and a $Li_{3.5}Si_{0.5}P_{0.5}O_4$ powder as a solid electrolyte may be mixed in a predetermined volume ratio, and the mixture may be dispersed in a solvent and a vehicle so that a negative electrode paste can be prepared. The active material powder and the solid electrolyte powder preferably have a particle diameter (particle size or powder particle size) of 3 µm or less with respect to all of the positive electrode active material, the negative electrode active material, and the solid electrolyte. The ratio of the particle size of the active material powder to that of the solid electrolyte powder is preferably from 1:50 to 50:1 with respect to both the positive and negative electrode active materials. Within the above particle size range and the above particle size ratio range, a matrix structure will be properly formed in the electrode layer by baking, so that an improvement in battery performance, such as a reduction in internal resistance or an increase in discharge capacity, can be effectively achieved. The mixing volume ratio of the active material powder to the solid electrolyte powder is preferably in the range of 80:20 to 20:80. In addition, a $Li_{3.5}Si_{0.5}P_{0.5}O_4$ powder as a solid electrolyte may be dispersed in a solvent and a vehicle so that a solid electrolyte paste can be prepared.

Unless the effects of the invention are not reduced, a small amount of an electrically-conductive material may be added as a material for the paste used to form the positive electrode layer and/or the negative electrode layer in addition to the active material and the solid electrolyte. When the electrically-conductive material is added, the volume ratio X:Y is preferably from 80:20 to 20:80, and the volume ratio Z:(X+Y+Z) is preferably from 1:100 to 80:100, wherein X:Y:Z represents the volume ratio of the active material/the solid electrolyte/the electrically-conductive material.

The prepared pastes are applied in the desired order onto a substrate such as PET and dried as needed, and then the substrate is peeled off so that a green sheet is obtained. The pastes may be applied using any known method such as screen printing, coating, transfer, or doctor blade method.

The desired number of the prepared green sheets, respectively, for the positive electrode layer, the solid electrolyte layer, and the negative electrode layer are stacked in the desired order and optionally subjected to alignment, cutting, etc., so that a laminate is formed. When a parallel or series-parallel battery is manufactured, the green sheets are preferably aligned and stacked so that the end face of the positive electrode layer does not coincide with the end face of the negative electrode layer.

The prepared laminate is subjected to one-time press-bonding. The press-bonding should be performed under heating, in which the heating temperature is typically from 40 to 80° C. The press-bonded laminate is baked, for example, by heating under the atmosphere. As used herein, the term "bake" or "baking" refers to a heat treatment for the purpose of sintering. The term "sintering" refers to a phenomenon in which a group of solid particles are solidified into a compact product called a sintered body, when heated at temperatures below the melting point. In the manufacture of the lithium ion secondary battery of the invention, the sintering temperature is preferably in the range of 600 to 1,100° C. This is because if it is below 600° C., no matrix structure would be formed in the electrode layer, and if it is above 1,100° C., a problem may occur, such as melting of the solid electrolyte or a change in the structure of the positive or negative electrode active material. For example, the sintering time is from 1 to 3 hours.

A first example of the method for manufacturing a multilayer, all-solid-state, lithium ion secondary battery may include steps (1) to (5) described below. FIGS. 2(a) to 2(e) are step-wise cross-sectional views illustrating an example of the method for manufacturing a lithium ion secondary battery according to an embodiment of the invention.

Step (1): Prepared are a positive electrode paste containing a solid electrolyte and a positive electrode active material, a negative electrode paste containing a solid electrolyte and a negative electrode active material, and a solid electrolyte paste containing a solid electrolyte powder.

Step (2): The solid electrolyte paste is applied onto a PET substrate 31 and dried to form a solid electrolyte sheet 32 (FIG. 2(a)). Hereinafter, the green sheet will be simply referred to as the sheet. The positive electrode paste is then applied onto a solid electrolyte sheet 34 and dried to form a positive electrode sheet 35 (FIG. 2(b)). The negative electrode paste is also applied onto a solid electrolyte sheet 36 and dried to form a negative electrode sheet 38 (FIG. 2(b)).

Step (3): A positive electrode unit where the solid electrolyte sheet and the positive electrode sheet are stacked is peeled off from the PET substrate. A negative electrode unit where the solid electrolyte sheet and the negative electrode sheet are stacked is also peeled off from the PET substrate. The positive electrode units and the negative electrode units are alternately stacked to form a laminate of alternately stacked positive electrode sheets 43 and negative electrode sheets 44 with solid electrolyte sheets 42 interposed therebetween. In this step, if necessary, the positive and negative electrode units may be aligned so that the negative electrode sheets are not exposed at one side face of the laminate and the positive electrode sheets are not exposed at the other side face, when stacked (FIG. 2(c)).

Step (4): The laminate is baked so that a sintered laminate is obtained (FIG. 2(d)).

Step (5): At side faces of the laminate, a positive electrode terminal 47 is formed so as to be connected to the positive electrode layers 47, and a negative electrode terminal 49 is formed so as to be connected to the negative electrode layers 46. For example, each electrode terminal (lead electrode) may be formed by applying a lead electrode paste to each side face of the battery and then baking the paste at a temperature of 600 to 1,100° C. Although not shown, if necessary, a protective layer may be formed on the outermost part of the laminate, when the battery is finished.

A second example of the method for manufacturing a multilayer, all-solid-state, lithium ion secondary battery may include steps (i) to (iii) described below.

Step (i): Prepared are a positive electrode paste containing a solid electrolyte and a positive electrode active material, a negative electrode paste containing a solid electrolyte and a negative electrode active material, and a solid electrolyte paste containing a lithium ion-conducting inorganic material powder.

Step (ii): The positive electrode paste, the solid electrolyte paste, the negative electrode paste, and the solid electrolyte paste are applied in this order and dried to form a laminate of a green sheet. In this step, if necessary, the positive and negative electrode units may be aligned so that the negative electrode sheets are not exposed at one side face of the laminate and the positive electrode sheets are not exposed at the other side face, when stacked.

Step (iii): If necessary, the substrate used in forming the green sheet may be peeled off, and the laminate is baked so that a sintered laminate is obtained.

Step (iv): At side faces of the laminate, a positive electrode terminal is formed so as to be connected to the positive electrode layers, and a negative electrode terminal is formed so as to be connected to the negative electrode layers. If necessary, a protective layer may be formed on the outermost part of the laminate, when the battery is finished.

For the manufacture of a battery having a structure in which a collector layer is placed on an electrode layer, a third example of the method for manufacturing a multilayer, all-solid-state, lithium ion secondary battery may include steps (1') to (5') described below. Step (1'): Prepared are a positive electrode paste containing a solid electrolyte and a positive electrode active material, a negative electrode paste containing a solid electrolyte and a negative electrode active material, and a solid electrolyte paste containing a solid electrolyte powder. Step (2'): The solid electrolyte paste, the positive electrode paste, a positive electrode collector paste, and the positive electrode paste are applied in this order onto a PET substrate and optionally dried, and then the substrate is peeled off so that a positive electrode unit is obtained. The solid electrolyte paste, the negative electrode paste, a negative electrode collector paste, and the negative electrode paste are applied in this order onto a substrate and optionally dried, and then the substrate is peeled off so that a negative electrode unit is obtained. Step (3'): The positive electrode units and the negative electrode units are alternately stacked to form a laminate of alternately stacked positive and negative electrode sheets with solid electrolyte sheets interposed therebetween. In this step, if necessary, the positive and negative electrode units may be aligned so that the negative electrode sheets are not exposed at one side face of the laminate and the positive electrode sheets are not exposed at the other side face, when stacked. Step (4'): The laminate is subjected to press bonding and baking so that a sintered laminate is obtained. Step (5'): At side faces of the laminate, a positive electrode terminal is formed so as to be connected to the positive electrode layers, and a negative electrode terminal is formed so as to be connected to the negative electrode layers. For example, each electrode terminal (lead electrode) may be formed by applying a lead electrode paste to each side face of the battery and then baking the paste at a temperature of 600 to 1,100° C. Although not shown, if necessary, a protective layer may be formed on the outermost part of the laminate, when the battery is finished.

[Differences from Similar Conventional Techniques]

Patent Document 3 discloses a technique that includes: mixing a positive electrode active material with low-melting-point glass to form a positive electrode slurry and applying the slurry onto a PET film to form a positive electrode layer; mixing an active material, a solid electrolyte, and low-melting-point glass to form a positive electrode-side mixture layer slurry and applying the slurry onto the positive electrode layer to form a positive electrode-side mixture layer; mixing a solid electrolyte with low-melting-point glass to form a solid electrolyte slurry and applying the slurry onto the positive electrode-side mixture layer to form a solid electrolyte layer;

mixing an active material, a solid electrolyte and low-melting-point glass to form a negative electrode-side mixture layer slurry and applying the slurry onto the solid electrolyte layer to form a negative electrode-side mixture layer; mixing a negative electrode active material with low-melting-point glass to form a negative electrode slurry and applying the slurry onto the negative electrode-side mixture layer to form a negative electrode layer; and baking the formed laminated raw sheet at a time to form a battery.

According to Patent Document 3, when the mixture layer is formed, low-melting-point glass is added to the active material and the solid electrolyte so that these materials can be strongly bound together. As described in paragraph [0037] of Patent Document 3, however, the glass is an amorphous material and hence has a problem that it can easily react with the electrode active material in a heat treatment process and form a reaction layer to increase interface resistance. In contrast, the battery according to the invention does not cause the problem of an increase in interface resistance, because the materials and the manufacturing conditions are appropriately selected so that robust electrode layers can be formed without the addition of glass.

Patent Document 4 discloses a battery that is made of a sintered material composed of a metal oxide as an active material and a solid electrolyte in which conductive particles are dispersed. In Examples of Patent Document 4, a liquid electrolyte layer is described, while it states that the electrolyte layer may be a solid or a liquid. After electrodes are formed, baking is performed at 550° C. in the air. Patent Document 4 discloses that when the sintered material of the metal oxide and the solid electrolyte is used to form an electrode active material, the filling factor of the active material can be improved, a large contact area between the active material and the solid electrolyte in the electrode can be ensured, and the impedance in the electrode can be reduced.

Unfortunately, the battery manufactured by the technique described in Patent Document 4 has a problem that the sintering temperature is too low to form a matrix structure in the electrode, and actually, a significant reduction in internal resistance or a significant increase in battery capacity cannot be achieved.

EXAMPLES

The invention is more specifically described in the following examples which are not intended to limit the invention. Unless otherwise specified, the term "parts" means "parts by weight."

Example 1

Preparation of Positive Electrode Paste

The positive electrode active material used was $LiMn_2O_4$ prepared by the method described below.

$Li_2CO_3$ and $MnCO_3$ as starting materials were weighed in a molar ratio of 1:4, wet mixed with water as a solvent in a ball mill for 16 hours, and then dewatered and dried. The resulting powder was calcined in the air at 800° C. for 2 hours. The calcined product was coarsely ground, subjected to wet-mixing with water as a solvent in a ball mill for 16 hours, and then dewatered and dried, so that a positive electrode active material powder was obtained. The powder had an average particle size of 0.30 μm. The composition of the prepared powder was confirmed as $LiMn_2O_4$ using an X-ray diffraction meter.

A positive electrode paste was prepared by premixing $Li_{3.5}Si_{0.5}P_{0.5}O_4$ used as a solid electrolyte and $LiMn_2O_4$ used as the positive electrode active material powder in a volume ratio of 10:90 to 90:10, adding 100 parts of the resulting mixture to 15 parts of ethyl cellulose as a binder and 65 parts of dihydroterpineol as a solvent, and kneading and dispersing the mixture in a three roll mill to form a positive electrode paste.

(Preparation of Negative Electrode Paste)

The negative electrode active material used was $Li_{4/3}Ti_{5/3}O_4$ prepared by the method described below.

$Li_2CO_3$ and $TiO_2$ as starting materials were weighed in a molar ratio of 2:5, wet mixed with water as a solvent in a ball mill for 16 hours, and then dewatered and dried. The resulting powder was calcined in the air at 800° C. for 2 hours. The calcined product was coarsely ground, subjected to wet-mixing with water as a solvent in a ball mill for 16 hours, and then dewatered and dried, so that a negative electrode active material powder was obtained. The powder had an average particle size of 0.32 μm. The composition of the prepared powder was confirmed as $Li_{4/3}Ti_{5/3}O_4$ using an X-ray diffraction meter.

A negative electrode paste was prepared by premixing $Li_{3.5}Si_{0.5}P_{0.5}O_4$ used as a solid electrolyte and $Li_{4/3}Ti_{5/3}O_4$ used as the negative electrode active material powder in a volume ratio of 50:50, adding 100 parts of the resulting mixture to 15 parts of ethyl cellulose as a binder and 65 parts of dihydroterpineol as a solvent, and kneading and dispersing the mixture in a three roll mill to form a negative electrode paste.

(Preparation of Solid Electrolyte Sheet)

The solid electrolyte used was $Li_{3.5}Si_{0.5}P_{0.5}O_4$ prepared by the method described below.

$Li_2CO_3$, $SiO_2$, and $Li_3PO_4$ as starting materials were weighed in a molar ratio of 2:1:1, wet mixed with water as a solvent in a ball mill for 16 hours, and then dewatered and dried. The resulting powder was calcined in the air at 950° C. for 2 hours. The calcined product was coarsely ground, subjected to wet-mixing with water as a solvent in a ball mill for 16 hours, and then dewatered and dried, so that a lithium ion-conducting inorganic material powder was obtained. The powder had an average particle size of 0.54 μm. The composition of the prepared powder was confirmed as $Li_{3.5}Si_{0.5}P_{0.5}O_4$ using an X-ray diffraction meter.

Subsequently, 100 parts of ethanol and 200 parts of toluene were added to 100 parts of the powder in a ball mill, and they were wet-mixed. Thereafter, 16 parts of a polyvinyl butyral-based binder and 4.8 parts of benzyl butyl phthalate were further added and mixed so that a lithium ion-conducting inorganic material paste was prepared. The lithium ion-conducting inorganic material paste was formed into a sheet on a PET film substrate by a doctor blade method so that a 13 μm thick, lithium ion-conducting, inorganic material sheet was obtained.

(Preparation of Collector Paste)

Ten parts of ethyl cellulose as a binder and 50 parts of dihydroterpineol as a solvent were added to 100 parts of Ag/Pd used in a weight ratio of 70/30, and the mixture was kneaded and dispersed in a three roll mill so that a collector paste was obtained. In this process, the Ag/Pd used in a weight ratio of 70/30 was a mixture of an Ag powder (0.3 μm in average particle size) and a Pd powder (1.0 μm in average particle size).

(Preparation of Lead Electrode Paste)

Ten parts of ethyl cellulose as a binder and 60 parts of dihydroterpineol as a solvent were added to a mixture of 100 parts of an Ag powder and 5 parts of a glass frit, and the resulting mixture was kneaded and dispersed in a three roll mill so that a lead electrode paste was obtained.

Figure 2:
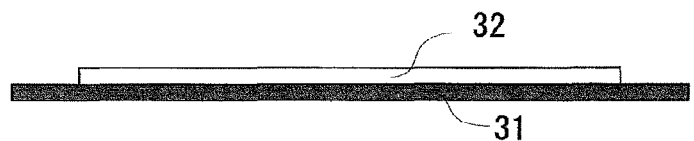
FIGS. 2(a) to 2(e) are step-wise cross-sectional views illustrating an example of the method for manufacturing a lithium ion secondary battery according to an embodiment of the invention.
Figure 2:
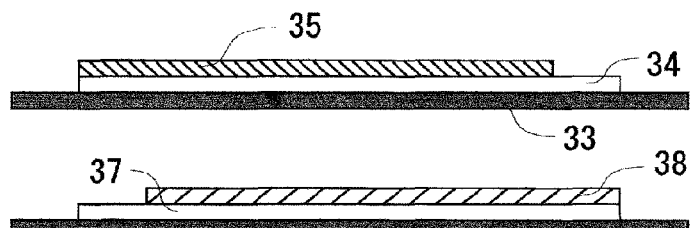
Figure 2:
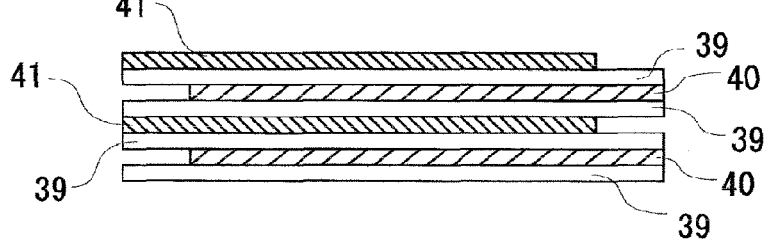
Figure 2:
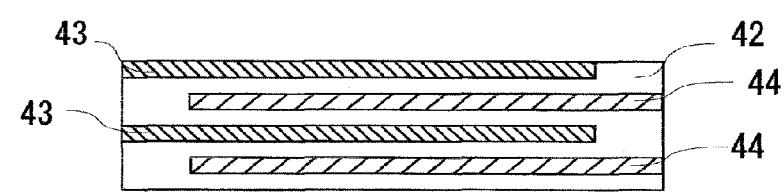
Figure 2:
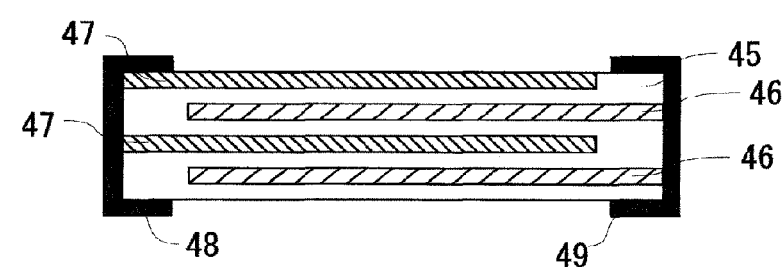

A multilayer, all-solid-state, lithium ion secondary battery having the structure shown in FIG. 2(e) was manufactured using these pastes.

(Preparation of Positive Electrode Unit)

The positive electrode paste was printed with a thickness of 8 μm on the opposite surface of the 13 μm thick, lithium ion-conducting, inorganic material sheet from the PET film by screen printing. The printed positive electrode paste was then dried at 80 to 100° C. for 5 to 10 minutes, and the positive electrode collector paste was printed with a thickness of 5 μm thereon by screen printing. The printed positive electrode collector paste was then dried at 80 to 100° C. for 5 to 10 minutes, and the positive electrode paste was printed again with a thickness of 8 μm thereon by screen printing. The printed positive electrode paste was dried at 80 to 100° C. for 5 to 10 minutes. As a result, a positive electrode unit sheet was obtained, which had the positive electrode paste, the positive electrode collector paste, and the positive electrode paste printed in this order on the lithium ion-conducting inorganic material sheet.

(Preparation of Negative Electrode Unit)

The negative electrode paste was printed with a thickness of 8 μm on the opposite surface of the 13 μm thick, lithium ion-conducting, inorganic material sheet from the PET film by screen printing. The printed negative electrode paste was then dried at 80 to 100° C. for 5 to 10 minutes, and the negative electrode collector paste was printed with a thickness of 5 μm thereon by screen printing. The printed negative electrode collector paste was then dried at 80 to 100° C. for 5 to 10 minutes, and the negative electrode paste was printed again with a thickness of 8 μm thereon by screen printing. The printed negative electrode paste was dried at 80 to 100° C. for 5 to 10 minutes. As a result, a negative electrode unit sheet was obtained, which had the negative electrode paste, the negative electrode collector paste, and the negative electrode paste printed in this order on the lithium ion-conducting inorganic material sheet.

(Preparation of Laminate)

After the PET films were peeled off from the positive electrode unit and the negative electrode unit, respectively, the two types of units were alternately stacked with the lithium ion-conducting inorganic material interposed therebetween. In this process, the positive electrode units and the negative electrode units were displaced from each other and stacked so that the positive electrode collectors extended only to one end face and the negative electrode collectors extended only to the other end face. Subsequently, the laminate was molded at a temperature of 80° C. and a pressure of 1000 kgf/cm$^2$ and then cut into a laminated block. Subsequently, the laminated block was baked to give a laminated product. The baking was performed in the air by raising the temperature to 1,000° C. at a rate of 200° C./hour and holding the temperature for 2 hours. After the baking, the product was subjected to natural cooling. The resulting sintered laminate had a thickness of each lithium ion-conducting inorganic material of 7 μm, a thickness of each positive electrode layer of 5 μm, and a thickness of each negative electrode layer of 6 μm. The laminate was 8 mm long×8 mm wide×0.1 mm high.

(Formation of Lead Electrodes)

The lead electrode paste was applied to the end faces of the laminate and baked at 800° C. to form a pair of lead electrodes, so that an all-solid-state, lithium ion secondary battery was obtained.

Comparative Example 1

Preparation of Positive Electrode Active Material Paste

Added to 100 parts of $LiMn_2O_4$ prepared as in the example were 15 parts of ethyl cellulose as a binder and 65 parts of dihydroterpineol as a solvent, and the mixture was kneaded and dispersed in a three roll mill so that a positive electrode active material paste was obtained.

(Preparation of Negative Electrode Active Material Paste)

Added to 100 parts of $Li_{4/3}Ti_{5/3}O_4$ prepared as in the example were 15 parts of ethyl cellulose as a binder and 65 parts of dihydroterpineol as a solvent, and the mixture was kneaded and dispersed in a three roll mill so that a negative electrode active material paste was obtained.

A battery was assembled as in the example, except that the positive and negative electrode units were prepared by applying the solid electrolyte paste, the positive electrode active material paste or the negative electrode active material paste, the collector paste, and the positive electrode active material paste or the negative electrode active material paste in this order and drying them. The resulting sintered laminate had a solid electrolyte layer thickness of 7 μm, a positive electrode active material layer thickness of 5 μm, a negative electrode active material layer thickness of 5 μm, and a collector layer thickness of 3 μm.

[Evaluation]

Figure 5:
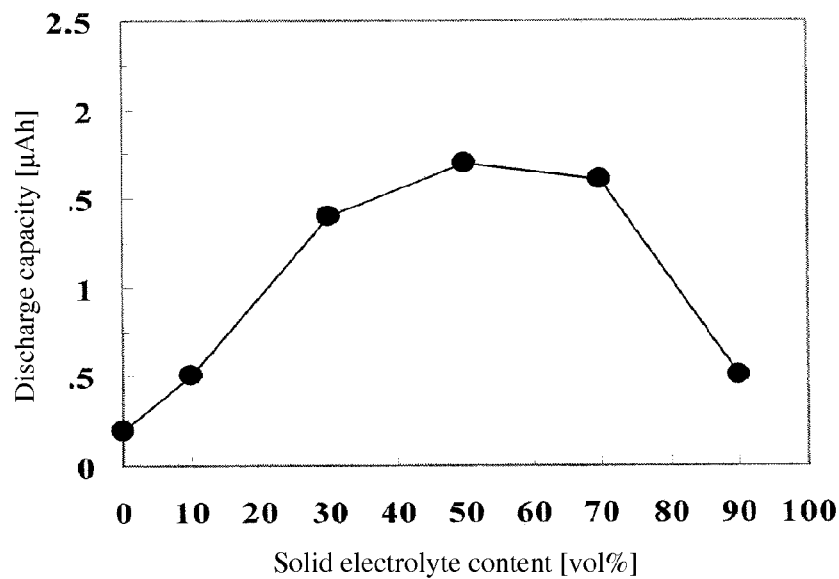
FIG. 5 is a graph showing the positive electrode layer composition-dependence of the discharge capacity of a lithium ion secondary battery according to the invention.
Figure 6:
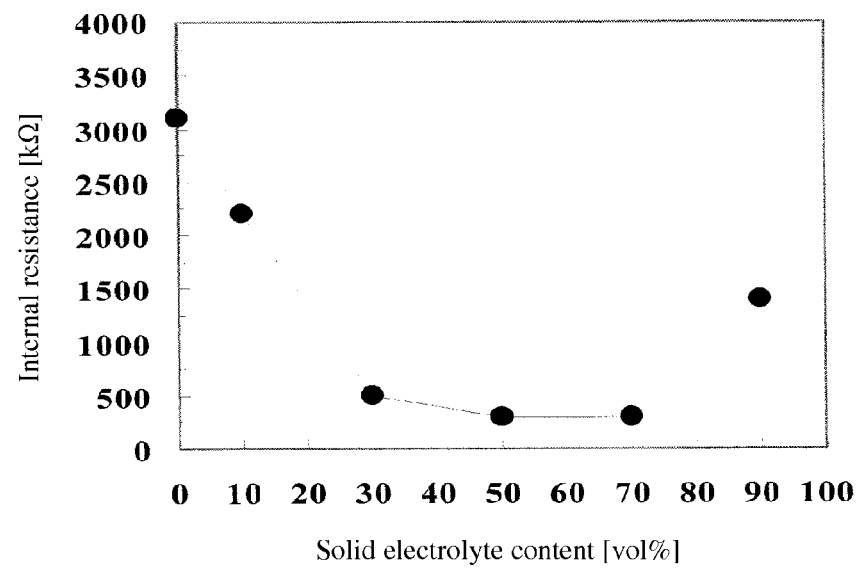
FIG. 6 is a graph showing the positive electrode layer composition-dependence of the internal resistance of a lithium ion secondary battery according to the invention.
Figure 7:
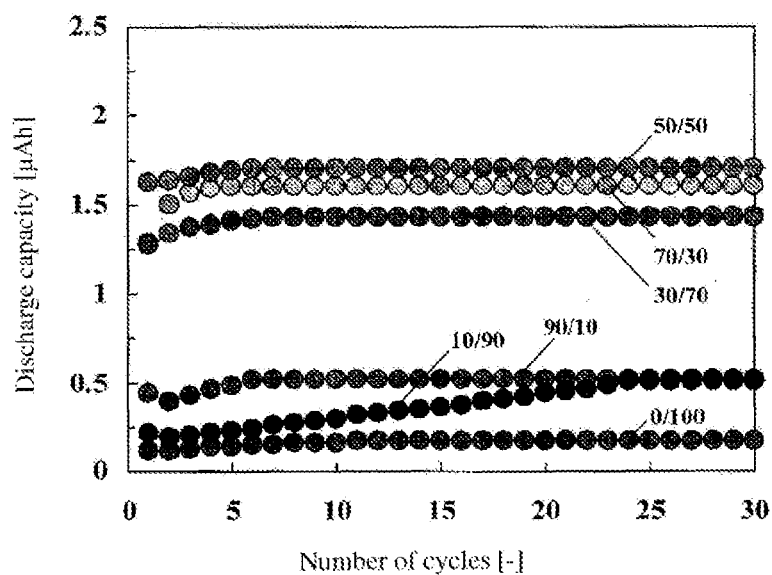
FIG. 7 is a graph showing the positive electrode layer composition-dependence of the cycle characteristics of a lithium ion secondary battery according to the invention.
Figure 8:
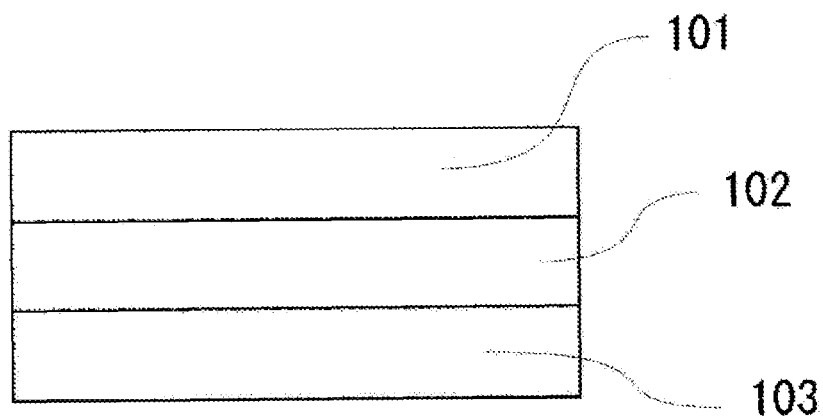
FIG. 8 is a cross-sectional view of the basic structure of a conventional lithium ion secondary battery.

Lead wires were attached respectively to the lead electrodes connected to the positive and negative electrode collectors, and the battery was measured for capacity and internal resistance. The measurement conditions were a charging current of 0.1 μA, a discharge current of 0.1 μA, a charging stop voltage of 4.0 V, and a discharge stop voltage of 0.5 V. Table 1 shows the discharge capacity at the 30th cycle. Table 1 also shows the internal resistance calculated from the voltage reduction during the discharge. FIGS. 5 and 6 are graphs of these data. FIG. 7 also shows cycle-by-cycle capacity (cycle characteristics) during 30 cycles of charging and discharging.

TABLE 1

|  | Solid electrolyte content [vol %] | Discharge capacity [μAh] | Internal resistance [kΩ] |
| --- | --- | --- | --- |
| Example 1 | 10 | 0.5 | 2200 |
|  | 30 | 1.4 | 500 |
|  | 50 | 1.7 | 300 |
|  | 70 | 1.6 | 300 |
|  | 90 | 0.5 | 1400 |
| Comparative Example 1 | — | 0.2 | 3100 |

FIG. 5 shows that the discharge capacity increased with increasing the solid electrolyte content up to about 50 vol %, beyond which the discharge capacity decreased with increasing the solid electrolyte content. FIG. 6 shows that the internal resistance decreased with increasing the solid electrolyte content up to about 50 vol %, beyond which the internal resistance increased with increasing the solid electrolyte content. This is probably because as the solid electrolyte content increases, the sintered behaviors of the solid electrolyte layer and the positive electrode active material layer become coincident with each other during one-time sintering, so that good bonding interface may be formed. At the same time, the contact area between the solid electrolyte and the active material increases, so that the resistance of the solid electrolyte/positive electrode active material interface decreases. In addition, the solid electrolyte, which has higher ion conductivity than the active material, takes part in the ionic conduction in the positive electrode active material layer, so that ionic conduction apparently increases in the positive electrode layer. On the other hand, as the solid electrolyte content increases, the amount of the active material, which substantially contributes to the battery reaction, decreases. It is considered that according to the balance between these factors, the internal resistance significantly decreased with increasing the solid electrolyte content up to 50 vol %, so that the discharge capacity increased, beyond which the internal resistance increased, and the discharge capacity decreased. The results shown above indicate that the optimal content of the solid electrolyte is between 20 to 80 vol %.

FIG. 7 demonstrates that every sample is not reduced in capacity over 30 cycles and has high reliability.

(SEM and EDS Images of Battery Cross-Section)

Figure 4:
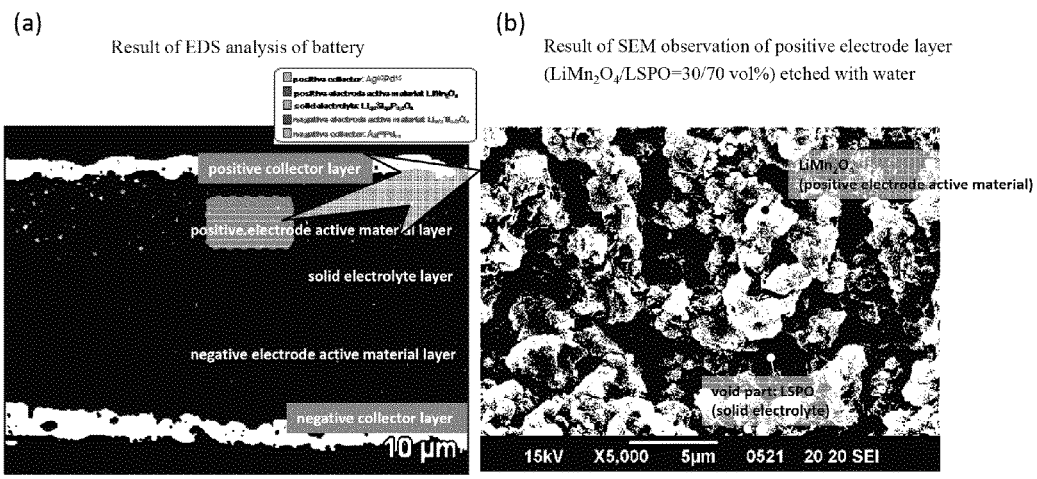
FIGS. 4(a) to 4(e) are cross-sectional photographs taken by EDS analysis of a lithium ion secondary battery according to the invention and by SEM of a positive electrode layer.
Figure 4:
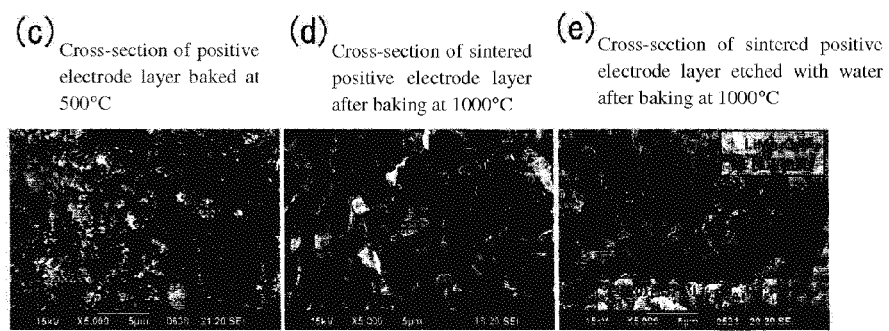

Next, the battery with a solid electrolyte content of 70 vol % prepared in Example 1 was subjected to EDS component analysis using a SEM. SEM observation was also performed on a sample that was obtained by preparing a sintered material having the same composition as that of the positive electrode layer of the battery and immersing the sintered material in water so that the solid electrolyte was removed. The results are shown in FIG. 4. The EDS image (FIG. 4(a)) and the SEM image (FIG. 4(b)) demonstrate that there is a structure in which a matrix made of the positive electrode active material is entangled with a solid electrolyte matrix.

SEM observation was further performed on the cross-section of samples that were obtained by baking a green compact with a solid electrolyte content of 70 vol %, which was the same as that of the positive electrode layer of the battery, at 500° C. and 1,000° C., respectively. The results are shown in FIGS. 4(c) to 4(e). The cross-sectional photograph (FIG. 4(c)) of the positive electrode layer baked at 500° C. shows a state in which particles of the positive electrode active material and the solid electrolyte are scattered, but does not show any matrix made of a solid electrolyte or a positive electrode active material. After the sintered product was immersed in water, the sintered product collapsed or was not able to keep its shape, which also shows that there was formed no positive electrode active material matrix. On the other hand, the cross-sectional photograph of the positive electrode layer baked at 1,000° C. shows a state in which the positive electrode active material and the solid electrolyte are sintered together. FIG. 4(e), which is a cross-sectional photograph taken after the sintered product was immersed in water so that the solid electrolyte was removed, shows that there is formed a structure in which the solid electrolyte is entangled with a matrix of the positive electrode active material. The results described above show that using appropriate baking conditions makes it possible to form a matrix structure in which an active material and a solid electrolyte are entangled with each other.

INDUSTRIAL APPLICABILITY

As described above, the lithium ion secondary battery and the method for manufacture thereof according to the invention are effective in reducing the internal resistance of lithium ion secondary batteries and increasing the discharge capacity of lithium ion secondary batteries. The invention can provide small-size, high-performance, large-capacity batteries and therefore make a contribution particularly in the field of electronics.

The invention claimed is:

1. A multilayer, all-solid-state, lithium ion secondary battery, comprising at least a laminate of alternately stacked positive and negative electrode layers having a solid electrolyte layer interposed therebetween,
   wherein at least one of the positive electrode layer or the negative electrode layer, in which an active material and a solid electrolyte form a matrix structure, consists essentially of the solid electrolyte, the active material, a collector material, and an additive,
   the active material is a material that efficiently releases and adsorbs lithium ions,
   the solid electrolyte is a material having low electron conductivity and high lithium ion conductivity,
   the additive is a boron compound, a sintering aid, or a combination thereof,
   the matrix structure is produced by baking the laminate at a temperature in a range of 600-1,100° C.,
   the matrix structure is a structure in which material particles that form the matrix are in contact with one another to be three dimensionally continuous, wherein the three dimensionally continuous structure may have a discontinuous part in a two-dimensional cross-section if at least another cross-section is continuous in the structure, and
   the baked laminate is a sintered laminate.

2. The lithium ion secondary battery according to claim 1, wherein the matrix structure has the solid electrolyte supported on a matrix of the active material.

3. The lithium ion secondary battery according to claim 1, wherein the matrix structure has the active material supported on a matrix of the solid electrolyte.

4. The lithium ion secondary battery according to claim 1, wherein the matrix structure is a structure formed by baking a coating of a paste obtained by mixing the active material, the solid electrolyte, the collector material, the additive, at least one solvent, and at least one binder.

5. The lithium ion secondary battery according to claim 1, wherein the matrix structure has a cross-sectional area ratio of the active material to the solid electrolyte in a range from 20:80 to 80:20.

6. The lithium ion secondary battery according to claim 2, wherein the matrix structure is a structure formed by baking a coating of a paste obtained by mixing the active material, the solid electrolyte, the collector material, the additive, at least one solvent, and at least one binder.

7. The lithium ion secondary battery according to claim 3, wherein the matrix structure is a structure formed by baking a coating of a paste obtained by mixing the active material, the solid electrolyte, the collector material, the additive, at least one solvent, and at least one binder.

8. The lithium ion secondary battery according to claim 1, wherein the active material and the solid electrolyte are entangled with each other in the matrix structure.

9. The multilayer, all-solid-state, lithium ion secondary battery according to claim 1,
   wherein the active material is at least one compound selected from the group consisting of lithium manganese complex oxide, lithium nickel complex oxide, lithium cobalt complex oxide, lithium vanadium complex oxide, lithium titanium complex oxide, manganese dioxide, titanium oxide, niobium oxide, vanadium oxide, and tungsten oxide, and
   the solid electrolyte is at least one compound selected from the group consisting of lithium silicophosphate ($Li_{3.5}Si_{0.5}P_{0.5}O_4$), lithium titanium phosphate ($LiTi_2(PO_4)_3$), lithium germanium phosphate ($LiGe_2(PO_4)_3$), $Li_2O$—$SiO_2$, $Li_2O$—$V_2O_5$—$SiO_2$, $Li_2O$—$P_2O_5$—$B_2O_2$, and $Li_2O$—$GeO_2$.

10. A method for manufacturing a lithium ion secondary battery, comprising at least:
   a stacking step of alternately stacking green sheets for positive and negative electrode layers with a green sheet for an electrolyte layer interposed therebetween to form a laminate of an electrolyte layer, a positive electrode layer, and a negative electrode layer; and a step of baking the laminate at a temperature in a range of 600-1,100° C. so as to form a sintered laminate, wherein the green sheet for at least one of the positive electrode layer or the green sheet for the negative electrode layer is formed by applying a paste obtained by mixing materials consisting essentially of an active material, a solid electrolyte, a collector material, an additive, at least one solvent, and at least one binder, to a respective sheet for the green sheet for the at least one of the positive electrode layer and baking the sheet so that at least one of the positive electrode layer or the negative electrode layer has a structure in which the active material and the solid electrolyte form a matrix structure, the matrix structure is a structure in which material particles that form the matrix are in contact with one another to be three dimensionally continuous, wherein the three dimensionally continuous structure may have a discontinuous part in a two-dimensional cross-section if at least another cross-section is continuous in the structure, the active material is a material that efficiently releases and adsorbs lithium ions, the solid electrolyte is a material having low electron conductivity and high lithium ion conductivity, and the additive is a boron compound, a sintering aid, or a combination thereof.

11. The method according to claim 10, wherein
the active material is mixed in the paste in a powder form having a particle size of 3 µm or less; and
the solid electrolyte is mixed in the paste in a powder form having a particle size of 3 µm or less.

12. The method according to claim 10,
wherein the active material in a powder form and the solid electrolyte in a powder form are mixed in a volume ratio of 20:80 to 80:20 to form the paste.

13. A multilayer, all-solid-state, lithium ion secondary battery, comprising at least a laminate of alternately stacked positive and negative electrode layers having a solid electrolyte layer interposed therebetween, wherein the laminate has an intermediate layer at a location between the solid electrolyte layer and the positive electrode layer or at a location between the solid electrolyte layer and the negative electrode layer, the intermediate layer has a matrix structure that an active material and a solid electrolyte form, and that is produced by baking the laminate, wherein the baking of the laminate is performed at a temperature in a range of 600-1,100° C., the intermediate layer consists essentially of the solid electrolyte, the active material, a collector material, and an additive, the active material is a material that efficiently releases and adsorbs lithium ions, the solid electrolyte is a material having low electron conductivity and high lithium ion conductivity, the additive is a boron compound, a sintering aid, or a combination thereof, the matrix structure is a structure in which material particles that form the matrix are in contact with one another to be three dimensionally continuous, wherein the three dimensionally continuous structure may have a discontinuous part in a two-dimensional cross-section if at least another cross-section is continuous in the structure, and the baked laminate is a sintered laminate.

14. The lithium ion secondary battery according to claim 13,
wherein the active material, which forms at least one of the positive electrode layer, the negative electrode layer, or the intermediate layer, is one or more compounds selected from the group consisting of lithium manganese complex oxide, lithium nickel complex oxide, lithium cobalt complex oxide, lithium vanadium complex oxide, lithium titanium complex oxide, manganese dioxide, titanium oxide, niobium oxide, vanadium oxide, and tungsten oxide.

15. The lithium ion secondary battery according to claim 13,
wherein the electrolyte, which forms at least one of the positive electrode layer, the negative electrode layer, or the intermediate layer, is one or more compounds selected from the group consisting of lithium silicophosphate ($Li_{3.5}Si_{0.5}P_{0.5}O_4$), lithium titanium phosphate ($LiTi_2(PO_4)_3$), lithium germanium phosphate ($LiGe_2(PO_4)_3$), $Li_2O$—$SiO_2$, $Li_2O$—$V_2O_5$—$SiO_2$, $Li_2O$—$P_2O_5$—$B_2O_3$, and $Li_2O$—$GeO_2$.

16. The lithium ion secondary battery according to claim 13,
wherein the matrix structure has the solid electrolyte supported on a matrix of the active material.

17. The lithium ion secondary battery according to claim 13,
wherein the matrix structure has the active material supported on a matrix of the solid electrolyte.

18. The lithium ion secondary battery according to claim 13,
wherein the matrix structure is a structure formed by baking a coating of a paste obtained by mixing the active material, the solid electrolyte, a collector material, an additive, at least one solvent, and at least one binder.

19. The lithium ion secondary battery according to claim 13, wherein the active material and the solid electrolyte are entangled with each other in the matrix structure.

20. A method for manufacturing a lithium ion secondary battery, comprising at least:
a stacking step of alternately stacking green sheets for positive and negative electrode layers with a green sheet for an electrolyte layer interposed therebetween to form a laminate of an electrolyte layer, a positive electrode layer, a negative electrode layer, and an intermediate layer; and a step of baking the laminate at a temperature in a range of 600-1,100° C. so as to form a sintered laminate, wherein a green sheet for an intermediate layer is placed at at least one of a location between the green sheet for the positive electrode layer and the green sheet for the electrolyte layer or at a location between the green sheet for the negative electrode layer and the green sheet for the electrolyte layer, and the intermediate layer is formed by applying a paste obtained by mixing materials consisting essentially of an active material, a solid electrolyte, a collector material, an additive, at least one solvent, and at least one binder to a sheet and baking the sheet so that the intermediate layer has a structure in which the active material and the solid electrolyte form a matrix structure, the matrix structure is a structure in which material particles that form the matrix are in contact with one another to be three dimensionally continuous, wherein the three dimensionally continuous structure may have a discontinuous part in a two-dimensional cross section if at least another cross-section is continuous in the structure, the active material is a material that efficiently releases and adsorbs lithium ions, the solid electrolyte is a material having low electron conductivity and high lithium ion conductivity, and the additive is a boron compound, a sintering aid, or a combination thereof.

* * * * *